(12) United States Patent
Wang et al.

(10) Patent No.: US 11,086,202 B2
(45) Date of Patent: Aug. 10, 2021

(54) GIMBAL CONTROL METHOD, DEVICE, AND GIMBAL

(71) Applicant: SZ DJI OSMO TECHNOLOGY CO., LTD., Shenzhen (CN)

(72) Inventors: Yan Wang, Shenzhen (CN); Tie Su, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 55 days.

(21) Appl. No.: 16/457,123

(22) Filed: Jun. 28, 2019

(65) Prior Publication Data

US 2019/0339594 A1 Nov. 7, 2019

Related U.S. Application Data

(63) Continuation of application No. PCT/CN2016/113475, filed on Dec. 30, 2016.

(51) Int. Cl.
*G03B 17/56* (2021.01)
*F16M 11/12* (2006.01)
*F16M 11/18* (2006.01)
*G05D 3/12* (2006.01)
(Continued)

(52) U.S. Cl.
CPC ........... *G03B 17/561* (2013.01); *F16M 11/04* (2013.01); *F16M 11/10* (2013.01); *F16M 11/12* (2013.01); *F16M 11/123* (2013.01); *F16M 11/18* (2013.01); *G03B 17/56* (2013.01); *G05D 3/12* (2013.01)

(58) Field of Classification Search
CPC ........ G03B 17/56; F16M 11/04; F16M 11/12; F16M 11/10; F16M 11/18
USPC .......................................................... 396/428
See application file for complete search history.

(56) References Cited

U.S. PATENT DOCUMENTS 6,020,876 A * 2/2000 Rosenberg .............. G06F 3/011
345/157
6,147,674 A * 11/2000 Rosenberg ............. B25J 9/1689
345/157
(Continued)

FOREIGN PATENT DOCUMENTS

CN 101291428 A 10/2008
CN 101916119 A 12/2010
(Continued)

OTHER PUBLICATIONS

The World Intellectual Property Organization (WIPO), International Search Report for PCT/CN2016/113475, dated Sep. 21, 2017, 8 Pages (including translation).

*Primary Examiner* — Clayton E. LaBalle
*Assistant Examiner* — Kevin C Butler
(74) *Attorney, Agent, or Firm* — Anova Law Group, PLLC

(57) ABSTRACT

A gimbal control method includes obtaining a working parameter of a gimbal, where the gimbal includes an axial arm and a motor configured to drive the axial arm to rotate to drive a photographing device mounted on the gimbal to move in one or more directions; detecting that the working parameter matches a preset condition that a human force is applied to gimbal; and according to a direction of the human force applied to the gimbal, controlling the motor to drive the axial arm to rotate to a target attitude at which the human force stops to be applied to the gimbal.

18 Claims, 6 Drawing Sheets

(51) Int. Cl.
*F16M 11/04* (2006.01)
*F16M 11/10* (2006.01)

(56) References Cited

U.S. PATENT DOCUMENTS

| | | | |
|---|---|---|---|
| 6,169,540 B1* | 1/2001 | Rosenberg | G05G 9/047 |
| | | | 345/157 |
| 2004/0160415 A1* | 8/2004 | Rosenberg | G06F 3/0383 |
| | | | 345/156 |
| 2005/0052531 A1* | 3/2005 | Kozlov | H04N 5/23287 |
| | | | 348/143 |
| 2010/0079101 A1* | 4/2010 | Sidman | F16M 11/041 |
| | | | 318/649 |
| 2019/0011077 A1* | 1/2019 | Chen | B64D 47/08 |
| 2019/0113922 A1* | 4/2019 | Koyama | F16M 11/2014 |
| 2019/0162358 A1* | 5/2019 | Wang | B64D 47/08 |
| 2019/0339594 A1* | 11/2019 | Wang | G05B 19/19 |
| 2020/0003357 A1* | 1/2020 | Su | B64C 39/024 |
| 2020/0003362 A1* | 1/2020 | Su | F16M 11/12 |
| 2020/0213518 A1* | 7/2020 | Su | H04N 5/23287 |
| 2020/0278072 A1* | 9/2020 | Su | H04N 5/232 |

FOREIGN PATENT DOCUMENTS

| | | | |
|---|---|---|---|
| CN | 103105858 A | 5/2013 | |
| CN | 103148324 A | 6/2013 | |
| CN | 103246290 A | 8/2013 | |
| CN | 103309357 A | 9/2013 | |
| CN | 103841313 A | 6/2014 | |
| CN | 103901897 A | 7/2014 | |
| CN | 105676880 A | 6/2016 | |
| CN | 106125769 A | 11/2016 | |
| DE | 102006048006 A1 | 4/2008 | |
| EP | 1912431 A2 | 4/2008 | |
| JP | 4054859 B2 | 3/2008 | |
| WO | 2015165109 A1 | 11/2015 | |
| WO | 2016154996 A1 | 10/2016 | |
| WO | WO-2016154996 A1 * | 10/2016 | G05D 3/12 |
| WO | 2020062298 A1 | 4/2020 | |

* cited by examiner

GIMBAL CONTROL METHOD, DEVICE, AND GIMBAL

CROSS-REFERENCE TO RELATED APPLICATION

This application is a continuation of International Application No. PCT/CN2016/113475, filed on Dec. 30, 2016, the entire content of which is incorporated herein by reference.

TECHNICAL FIELD

The disclosure relates to the field of gimbal technology, in particular to a gimbal control method, device, and a gimbal.

BACKGROUND

A gimbal is a carrying device for mounting and fixing a photographing apparatus and can drive the photographing apparatus to move in one or more directions via cooperation of axial arms and motors of the gimbal, so as to capture images in a wide range. At present, gimbals have been widely used in various special industries. For example, in the field of aerial photography, after the photographing apparatus is fixed on the gimbal, an aircraft can carry the gimbal to a high altitude for photographing.

In related technologies, movements of the gimbal are usually controlled by a remote controller. A joystick or a dial wheel is disposed on the remote controller, and the user can send a movement instruction to the gimbal by operating the joystick or the dial wheel. According to the received movement instruction, the gimble controls the gimbal to drive a corresponding axial arm to rotate, shift, etc. However, due to the instability of the user's operation of the joystick or the dial wheel, it is often difficult to control the gimbal to move to a target attitude in one operation, and repeated operations may be needed for adjusting, resulting in relatively cumbersome operations and not high enough positioning accuracy.

SUMMARY

In accordance with the disclosure, there is provided a gimbal control method. The gimbal control method includes obtaining a working parameter of a gimbal, where the gimbal includes an axial arm and a motor configured to drive the axial arm to rotate to drive a photographing device mounted on the gimbal to move in one or more directions; detecting that the working parameter matches a preset condition that a human force is applied to gimbal; and according to a direction of the human force applied to the gimbal, controlling the motor to drive the axial arm to rotate to a target attitude at which the human force stops to be applied to the gimbal.

Also in accordance with the disclosure, there is provided a gimbal. The gimbal includes a fixing mechanism configured to fix a photographing apparatus mounted at the gimbal, one or more axial arms, a motor, an inertial measurement unit (IMU) and a controller. The motor is configured to drive a corresponding one of the one or more axial arms to rotate, thereby driving the photographing apparatus mounted to move in one or more directions. The controller configured to obtain working parameters of the gimbal, and in response to detecting that the working parameter matches a preset condition that a human force is applied to the gimbal and according to a direction of the human force applied to the gimbal, control the motor to drive the axial arm to rotate to a target attitude at which the human force stops to be applied to the gimbal.

According to the technical solution provided by embodiments of the present disclosure, in the embodiments of the present disclosure, when the working parameter is detected to match the preset condition that the human force is applied to the gimbal, the gimbal is controlled to change its target attitude according to the direction of the human force applied to the gimbal. Compared to the existing methods of controlling the target attitude of the gimbal through a remote controller, an operation process is simple and intuitive, and a positioning accuracy is high.

DESCRIPTION OF THE DRAWINGS

The drawings used in descriptions of the embodiments of the present disclosure are briefly described below. It is obvious that the drawings in the following description are only some embodiments of the present disclosure. Other drawings may also be obtained by those of ordinary skill in the art in view of the drawings without making creative efforts.

DETAILED DESCRIPTION

The technical solutions in the embodiments of the present disclosure are described in the following with reference to the accompanying drawings in the embodiments of the present disclosure. The described embodiments are only a part of the embodiments of the present disclosure, but not all embodiments. All other embodiments obtained by a person of ordinary skill in the art based on the embodiments of the present disclosure without creative efforts are within the scope of the present disclosure. Further, in case of no conflict, the features of the following embodiments and examples may be combined with each other.

The gimbal in the embodiment of the present disclosure may be a handheld gimbal or a gimbal carried by an aircraft. The gimbal generally includes an axial arm and a motor, where the motor is configured to drive the axial arm to rotate. Taking a common three-axis gimbal as an example, the three-axis gimbal includes three axial arms, and motors for driving three axial arms respectively, where the three axial arms are a pitch axis, a roll axis, and a lateral axis.

When the above-mentioned gimbal is controlled to change the target attitude, the photographing apparatus, for example, a camera or a video camera, mounted on the gimbal can be driven to move in one or more directions, thereby achieving photographing in a wide range. In the existing technologies, the user controls the gimbal to change the target attitude through a remoter controller device, such as a remoter controller joystick or a dial wheel, etc., of which the operation process is relatively cumbersome, and the positioning accuracy is not high enough. Therefore, in the embodiments of the present disclosure, there is provided a manner in which the user applies a force to the gimbal, to move the gimbal to the target attitude quickly and accurately.

The embodiments of the present disclosure are described in detail below with reference to the accompanying drawings.

Figure 1:
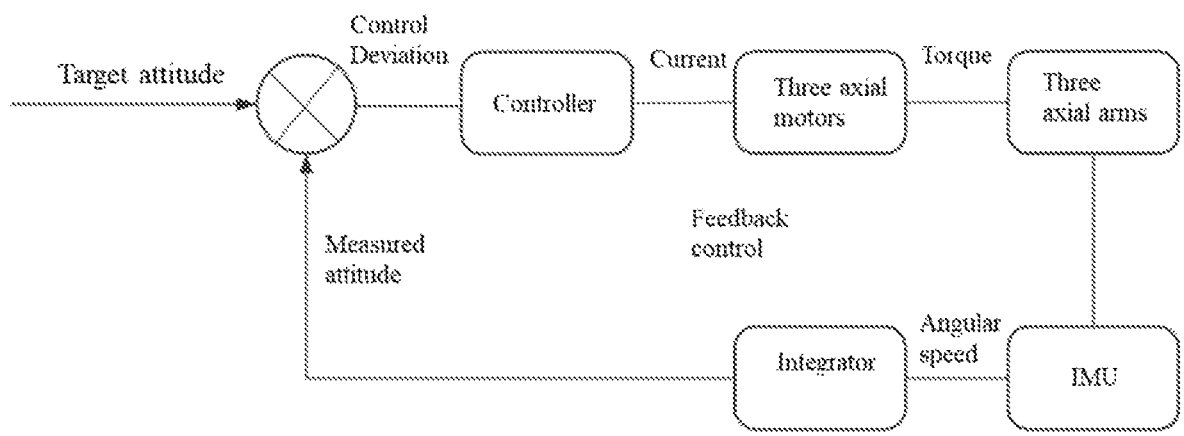
FIG. 1 is a schematic diagram showing a working principle of a three-axis gimbal.

FIG. 1 shows a schematic diagram of a working principle of a three-axis gimbal.

The three-axis gimbal shown in FIG. 1 includes a controller, three axial motors, three axial arms, an inertial measurement unit (IMU), and an integrator. The above three-axis gimbal can form a closed-loop PI (proportional-integral) control system by using a gyroscope of the IMU as a feedback element and the three axial motors as output elements.

The measured attitude of the gimbal can be obtained through the IMU, and the difference between the measured attitude and the target attitude is considered as a control deviation. The controller controls input currents of the three axial motors according to the input control deviation, thereby driving the three axial motors to work. The three axial motors output torque during the working process to drive the three axial arms to rotate. During the rotation, the measured attitude of the gimbal further changes. Through the above feedback control process, the gimbal can move to the target attitude.

Figure 2:
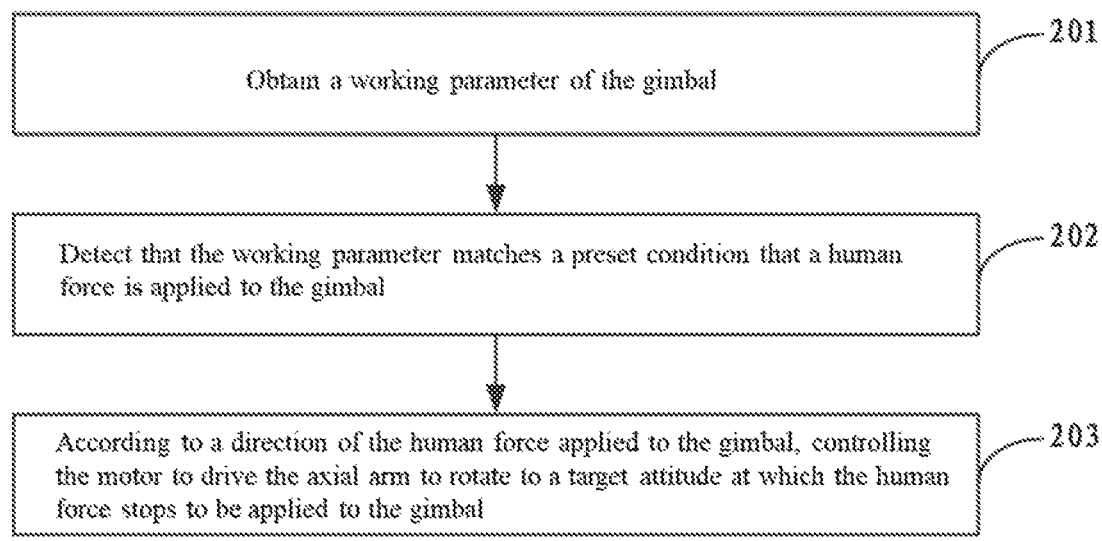
FIG. 2 is a flow chart of a gimbal control method according to some embodiments of the present disclosure.

FIG. 2 is a flow chart of a gimbal control method according to some embodiments of the present disclosure.

At 201, a working parameter of the gimbal is obtained.

As shown in combination with FIG. 1, the working parameter of the gimbal in the embodiment of the present disclosure may include one of currents of the motors, torques of the motors, or a control deviation of the gimbal. The above control deviation, currents and torques are usually proportional to each other.

At 202, it is detected that the working parameter matches a preset condition that a human force is applied to the gimbal.

Generally, parameter values of the detected working parameters with the human force applied to the gimbal may be relatively largely different from that for remote controller controlling the gimbal, and thus, the working parameters can be used as the basis for judging that the human force is applied to the gimbal.

When the human force is applied to the gimbal, the working parameters of the gimbal are usually larger than the working parameters of the gimbal that is controlled by the remote controller. When the gimbal is touched by the human force accidentally, the working parameters of the gimbal are usually also larger than those when the gimbal is controlled by the remote controller. But the difference between the gimbal being touched by the human force accidentally and the gimbal being applied with the human force is that the detected parameter value of the former is smaller than that of the latter. Based on the above analysis, depending on the type of the working parameters, the following exemplary implementations can be used to detect whether the human force is applied to the gimbal.

In an exemplary implementation, corresponding to that the working parameter at 201 is a current, whether the current is greater than a preset current threshold may be detected, and if the current is greater than the current threshold, it may be determined that the human force is applied to the gimbal.

In some embodiments, to avoid detecting that the gimbal is touched by the human force accidentally, it can be detected whether the current is always greater than the current threshold within a preset time period, and if always greater than the current threshold, it can be determined that the human force is applied to the gimbal.

In another exemplary implementation, corresponding to that the working parameter at 202 is a torque, after the current of the motor is obtained, the torque of the motor can be measured according to the proportional relationship between currents and torques, then it can be detected whether the torque is greater than a preset torque threshold, and if torque is greater than the torque threshold, it can be determined that the human force is applied to the gimbal.

In some embodiments, to avoid detecting that the gimbal is touched by the human force accidentally, it can be detected whether the torque is always greater than the torque threshold within a preset time period, and if always greater than the torque threshold, it may be determined that the human force is applied to the gimbal.

In another exemplary implementation, corresponding to that the control parameter at 202 is the control deviation, the measured attitude of the gimbal in the feedback control process can be collected through the IMU disposed on the gimbal. According to the measured attitude of the gimbal, the control deviation of the gimbal can be obtained. It can be detected whether the control deviation is greater than a preset deviation threshold, and if the control deviation is greater than the preset deviation threshold, it can be determined that the human force is applied to the gimbal.

In some embodiments, in order to avoid detecting that the gimbal is touched by the human force accidentally, it can be detected whether the control deviation is always greater than the deviation threshold within a preset time period, and if always greater than the deviation threshold, it may be determined that the human force is applied to the gimbal.

At 203, according to a direction of the human force applied to the gimbal, the motor is controlled to drive the axial arm to rotate to a target attitude at which the human force stops to be applied to the gimbal.

After detecting that the human force is applied to the gimbal, the application direction of the human force applied to the gimbal can be measured through the IMU disposed on the gimbal, and then the target speed for changing the target attitude of the gimbal is retrieved, where the target speed is greater than the speed of the human force applied to the gimbal. In the application direction, according to the above target speed, the gimbal can be rotated to the target attitude at which the human force stops to be applied to the gimbal.

It can be seen from the above embodiment that when the working parameters of the gimbal are detected to match the preset condition that the human force is applied to the gimbal, the gimbal is controlled to change its target attitude according to the direction of the human force applied to the gimbal, which, as compared to the existing methods of controlling the target attitude of the gimbal through a remoter controller, has a simple and intuitive operation process and a high positioning accuracy.

Figure 3:
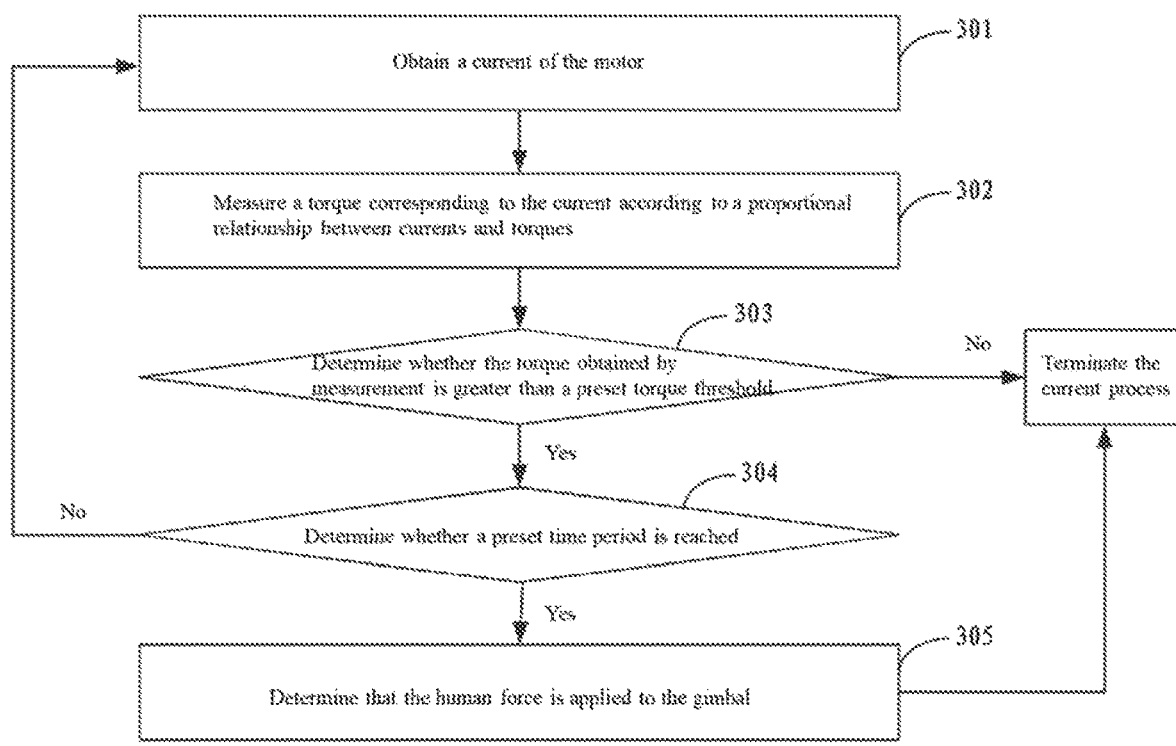
FIG. 3 is a flow chart of a gimbal control method according to some other embodiments of the present disclosure.

FIG. 3 is a flow chart of a gimbal control method according to some other embodiments of the present disclosure. The embodiment shows a process of detecting a motor torque to detect that the human force is applied to the gimbal.

At 301, a current of the motor is obtained.

Referring to FIG. 1, when the controller obtains the control deviation, the input currents of the motors can be controlled according to the control deviation. Taking the three-axis gimbal as an example, the controller can respectively control the input currents of the three motors according to the control deviation. Under normal circumstances, the control deviation of the gimbal is relatively small. In the embodiments of the present disclosure, when the human force is applied to the gimbal, the control deviation of the gimbal is instantaneously increased, and the input currents of the motors obtained according to the control deviation are also increased accordingly.

At 302, a torque corresponding to the current is measured according to a proportional relationship between currents and torques.

The torque of the motor refers to the torque that the motor outputs from its crankshaft end. The torque is the force that allows the corresponding axial arm of the motor to rotate. Usually the current of the motor is proportional to the torque, which is shown in the following equation:

$$M = Ca \times I,$$

where M represents the torque, Ca represents a constant, and I represents the current. When the current of the motor is obtained, the torque of the motor can be calculated according to the above equation.

At 303, it is determined whether the measured torque is greater than a preset torque threshold. If yes, 304 is executed; otherwise, the current process is terminated.

When the human force is applied to the gimbal, the torque of the gimbal is usually greater than the torque when the gimbal is controlled by the remote controller. Therefore, in the present embodiment, a torque threshold may be set in advance, and the torque threshold is a lower limit value for determining a torque when the human force is applied to the gimbal.

In this step, when the torque corresponding to the current of the motor is measured in real time, the torque is compared with the torque threshold. If the torque is not greater than the torque threshold, it can be determined that the gimbal is not applied with the human force, and the current process can be terminated. If the torque is larger than torque threshold, then 304 can be executed.

At 304, it is determined whether a preset time period is reached. If yes, 305 is executed; otherwise, the process returns to 301.

Since the torque of the gimbal when a human hand accidentally touches the gimbal is usually also greater than the torque when the gimbal is controlled by the remoter controller, the difference between the human hand accidentally touching the gimbal and the human force being applied to the gimbal is that a duration for a torque of the former being greater than the torque threshold is shorter than that of the latter. Therefore, in this embodiment, a time period may be preset for determining whether the torque of the gimbal continues to be greater than the torque threshold for a continuous period of time. As such, the human hand accidentally touching the gimbal can be prevented from being determined as the human force applied to the gimbal, so as to improve the accuracy to detect that gimbal is applied with the human force.

At 305, it is determined that the human force is applied to the gimbal, and the current process is terminated.

Figure 4:
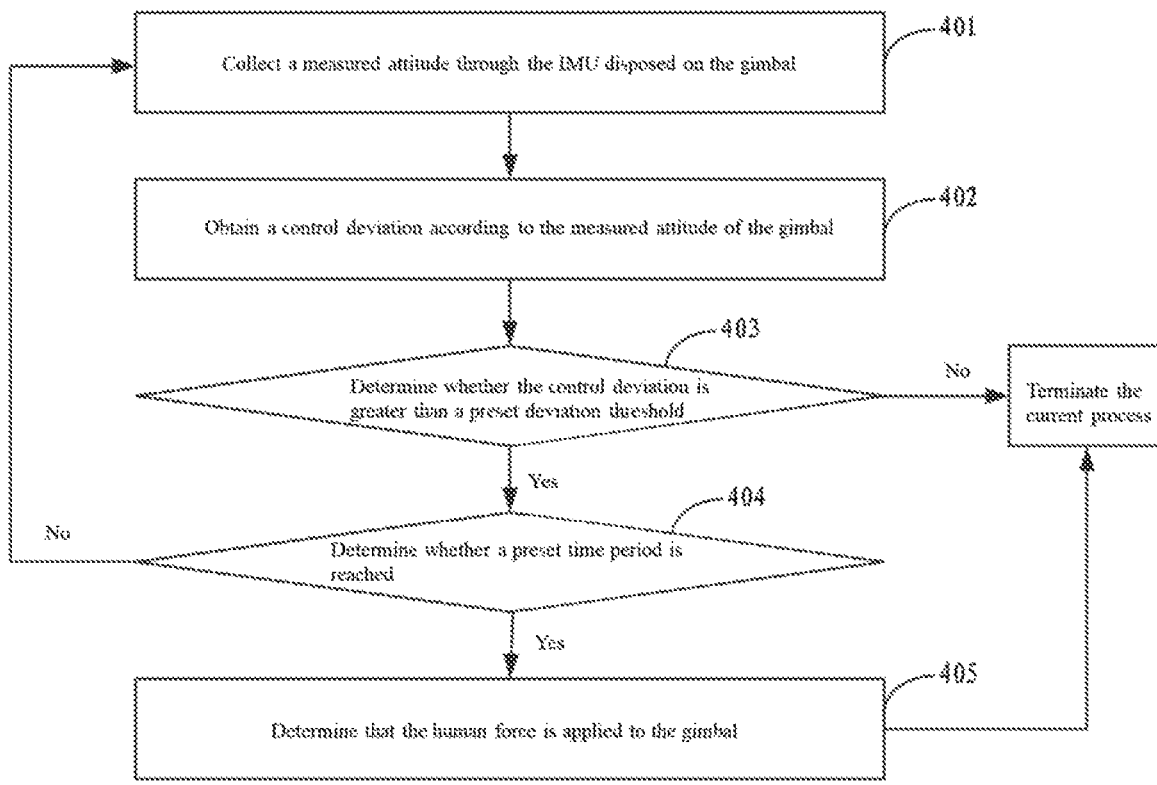
FIG. 4 is a flow chart of a gimbal control method according to some other embodiments of the present disclosure.

FIG. 4 is a flow chart of a gimbal control method according to some other embodiments of the present disclosure. The embodiment shows a process of controlling a deviation value to detect that the human force is applied to the gimbal.

At 401, a measured attitude of the gimbal is collected through the IMU disposed on the gimbal.

At 402, a control deviation of the gimbal is obtained according to the measured attitude of the gimbal.

As shown in FIG. 1, in the feedback control process of the embodiment of the present disclosure, the measured attitude of the gimbal can be obtained through the IMU disposed on the gimbal, and the control deviation of the gimbal is obtained according to the measured attitude. When the human force is applied to the gimbal, the initial target attitude is 0, and the control deviation is the largest at this time. In the process that the target attitude is continuously adjusted to the measured attitude, the control deviation is gradually reduced.

At 403, it is determined whether the control deviation is greater than a preset deviation threshold. If yes, 404 is executed; otherwise, the current process is terminated.

Under normal circumstances, the control deviation of the gimbal is relatively small, and when the human force is applied to the gimbal, the control deviation of the gimbal increases. Therefore, in this embodiment, a deviation threshold may be set in advance, and the deviation threshold is a lower limit value for determining a control deviation when the human force is applied to the gimbal.

In this step, after the control deviation of the gimbal is obtained in real time, the control deviation is compared with the deviation threshold. If the control deviation is not greater than the deviation threshold, it can be determined that currently the gimbal is not applied with the human force, and the current process can be terminated. If the control deviation is greater than the deviation threshold, then 404 is performed.

At 404, it is determined whether a preset time period is reached. If yes, 405 is executed; otherwise, 401 is returned to.

Since the control deviation of the gimbal is usually greater than the control deviation when the gimbal is controlled by the remoter controller when the human hand accidentally touches the gimbal, the difference between the human hand accidentally touching the gimbal and the powered gimbal being applied with the human force is that a duration of the control deviation of the former being greater than the deviation threshold is shorter than that of the latter. Therefore, in this embodiment, a time period may be set in advance to determine whether the control deviation of the gimbal continues to be greater than the deviation threshold for a continuous period of time. As such, the human hand accidentally touching the gimbal can be prevented from being determined as the human force applied to the gimbal, so as to improve the accuracy to detect that gimbal is applied with the human force.

At 405, it is determined that the human force applied to the gimbal is detected, and the current process is terminated.

Figure 5:
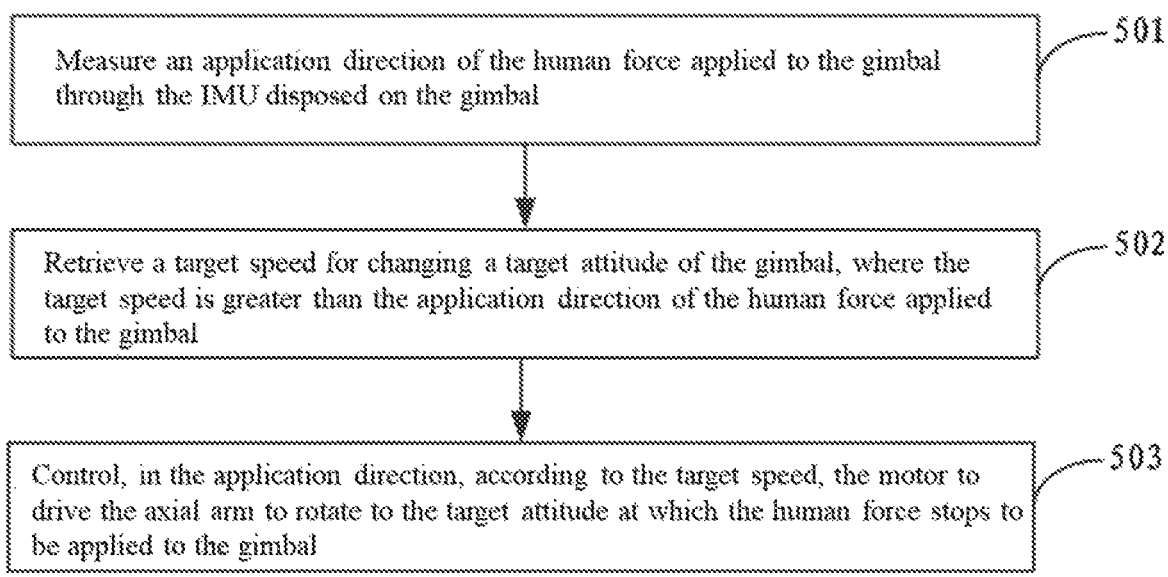
FIG. 5 is a flow chart of a gimbal control method according to some other embodiments of the present disclosure.

FIG. 5 is a flow chart of a gimbal control method according to some other embodiments of the present disclosure. The embodiment shows a process of changing a target attitude of a gimbal according to the application direction of the human force applied to the gimbal.

At 501, the application direction of the human force applied to the gimbal is measured through the IMU disposed on the gimbal.

The IMU can be used to measure the attitude information of the object. In this embodiment, after the human force applied to the gimbal is detected, the IMU can measure the application direction of the human force applied to the gimbal. For example, for the three-axis gimbal, the application direction can be detected when the human force is applied to at least one of the pitch axis, the roll axis, or the lateral axis.

At 502, a target speed for changing a target attitude of the gimbal is retrieved, and the target speed is greater than an application speed of the human force applied to the gimbal.

After the application direction of the human force applied to the gimbal is detected, if the gimbal is to be moved to the target attitude of the human force, the gimbal can be controlled to move at the target speed. The target speed is usually greater than the application speed of the human force applied to the gimbal. Taking a three-axis gimbal as an example, an angle sensor is provided on the motor for each of the three axes, and the angle sensor can measure the application speeds of different axial arms when the human force is applied to the gimbal.

When embodiments of the present disclosure are implemented, the general application speed of the human force applied to the gimbal can be tested in advance through multiple sets of test experiments. According to the application speed, the target speed for changing the target attitude of the gimbal can be determined. For example, the target speed can be slightly greater than the application speed. The gimbal controller can store the above target speed, and when detecting that the human force is applied to the gimbal, the above target speed can be retrieved, and the gimbal can be controlled to change the target attitude.

At 503, in the application direction, according to the target speed, the motor is controlled to drive the axial arm to rotate to the target attitude at which the human force stops to be applied to the gimbal.

In this step, in the detected application direction of gimbal applied with the human force, the target attitude of the gimbal is changed according to the target speed. That is, the feedback control is performed according to the target speed, so that axial arm is driven by the motor to rotate until the axial arm is rotate to the attitude at which the human force stops to be applied to the gimbal. In the above control process, the target speed is greater than the application speed. As such, it can be ensured that when the human force stops to be applied to the gimbal, the target attitude of the gimbal has changed to the actual attitude of the human force applied to the gimbal.

Corresponding to the embodiment of the control method for the gimbal according to the present disclosure, the present disclosure also provides embodiments of a gimbal control device and a gimbal.

Figure 6A:
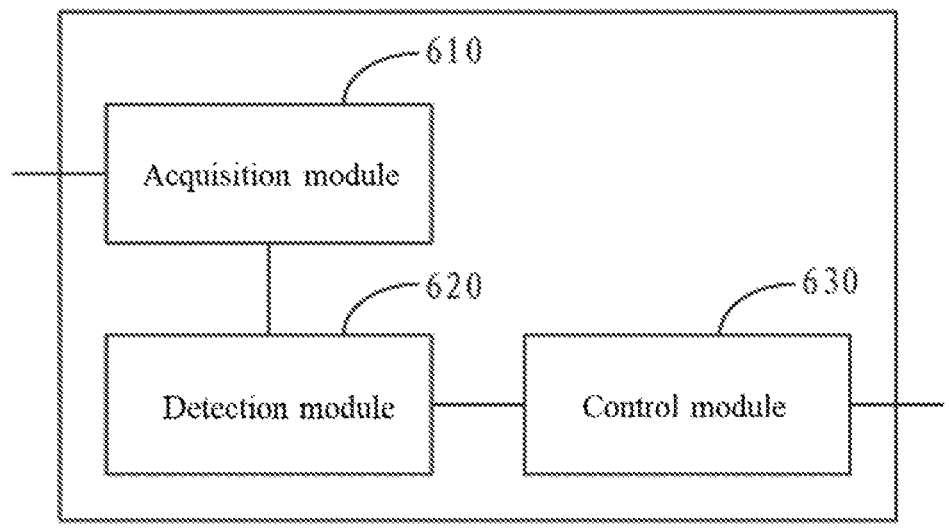
FIG. 6A is a block diagram of a gimbal control device according to some embodiments of the present disclosure.

FIG. 6A is a block diagram of a gimbal control device according to some embodiments of the present disclosure.

The gimbal control device includes an acquisition module 610, a detection module 620, and a control module 630.

The acquisition module 610 is configured to obtain a working parameter of the gimbal.

The detection module 620 is configured to detect that the working parameter matches the preset condition that a human force is applied to the gimbal.

The control module 630 is configured to according to a direction of the human force applied to the gimbal, control the motor to drive the axial arm to rotate to a target attitude at which the human force stops to be applied to the gimbal.

Figure 6B:
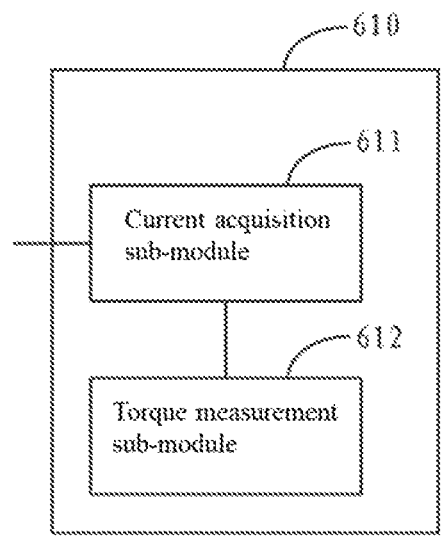
FIG. 6B is an exemplary block diagram of an acquisition module in FIG. 6A.

FIG. 6B is an exemplary block diagram of the acquisition module 610 in FIG. 6A according to an exemplary implementation.

The acquisition module 610 can include a current acquisition sub-module 611 and a torque measurement sub-module 612.

The current acquisition sub-module 611 is configured to obtain a current of the motor.

The torque measurement sub-module 612 is configured to measure a torque corresponding to the current according to a proportional relationship between currents and torques and determine the torque as the working parameter of the gimbal.

Correspondingly, the detection module 620 may be configured to detect whether the measured torque is greater than a preset torque threshold, and if the measured torque is greater than the torque threshold, detect the torque matches the preset condition that the human force is applied to the gimbal.

In some embodiments, the detection module 620 may be configured to detect whether the measured torque is greater than the torque threshold within a preset time period.

Figure 6C:
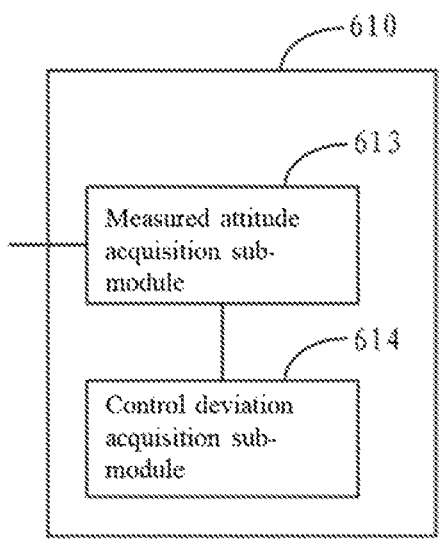
FIG. 6C is another exemplary block diagram of an acquisition module in FIG. 6A.

FIG. 6C is another exemplary block diagram of the acquisition module 610 in FIG. 6A according to another exemplary implementation.

The acquisition module 610 can include a measured attitude acquisition sub-module 613 and a control deviation acquisition sub-module 614.

The measured attitude acquisition sub-module 613 is configured to collect the measured attitude of the gimbal through an IMU disposed on the gimbal.

The control deviation acquisition sub-module 614 is configured to obtain a control deviation of the gimbal according to the measured attitude of the gimbal and determine the control deviation as the working parameter of the gimbal.

Correspondingly, the detection module 620 may be configured to detect whether the control deviation is greater than a preset deviation threshold, and if the control deviation is greater than the deviation threshold, detect the control deviation matches the preset condition that the human force is applied to the gimbal.

In some embodiments, the detection module 620 may be configured to detect whether the control deviation is always greater than the deviation threshold within a preset time period.

In another exemplary implementation, the detection module 620 may be configured to detect whether the current is greater than a preset current threshold when the working parameter obtained by the acquisition module 610 is a current of the motor, and if the current is greater than the current threshold, detect that the current matches a preset condition that the human force is applied to the gimbal.

In some embodiments, the detection module 620 may be configured to detect whether the current is greater than the current threshold within a preset time period.

Figure 6D:
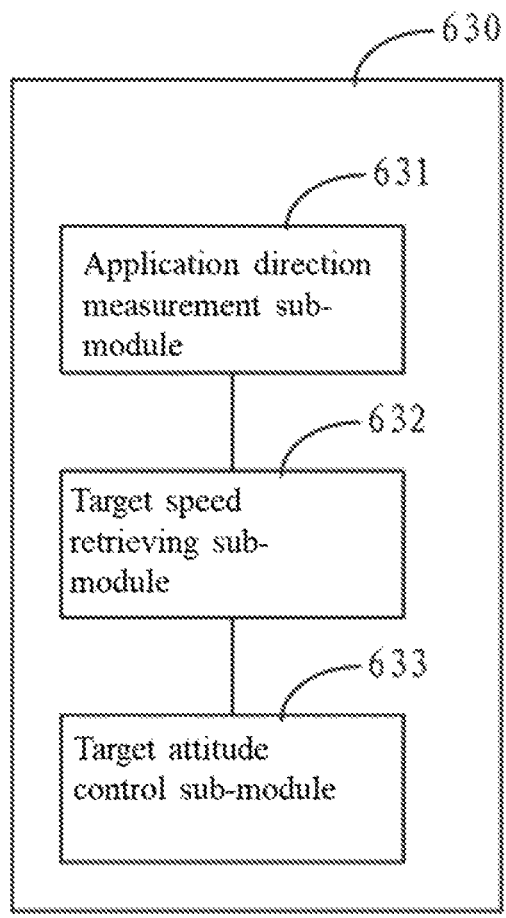
FIG. 6D is an exemplary block diagram of a control module in FIG. 6A.

FIG. 6D is an exemplary block diagram of a control module in FIG. 6A according to an exemplary implementation.

The control module 630 can include an application direction measurement sub-module 631, a target speed retrieving sub-module 632, and a target attitude control sub-module 633.

The application direction measurement sub-module 631 is configured to measure the application direction of the human force applied to the gimbal by using an IMU disposed on the gimbal.

The target speed retrieving sub-module 632 is configured to retrieve a target speed for changing the target attitude of the gimbal, where the target speed is greater than an application speed of the gimbal.

The target attitude control sub-module 633 is configured to control, according to the target speed, the motor to drive the axial arm to rotate to the target attitude at which the human force stops to be applied to the gimbal.

It can be seen from the above embodiment that when the detection module detects that the working parameters of the gimbal obtained by the acquisition module match the preset condition that the human force is applied to the gimbal, the control module controls the gimbal according to the direction of the human force applied to the gimbal. Compared to the existing methods of controlling the target attitude of the gimbal through a remote controller, an operation process is simple and intuitive, and a positioning accuracy is high.

Figure 7:
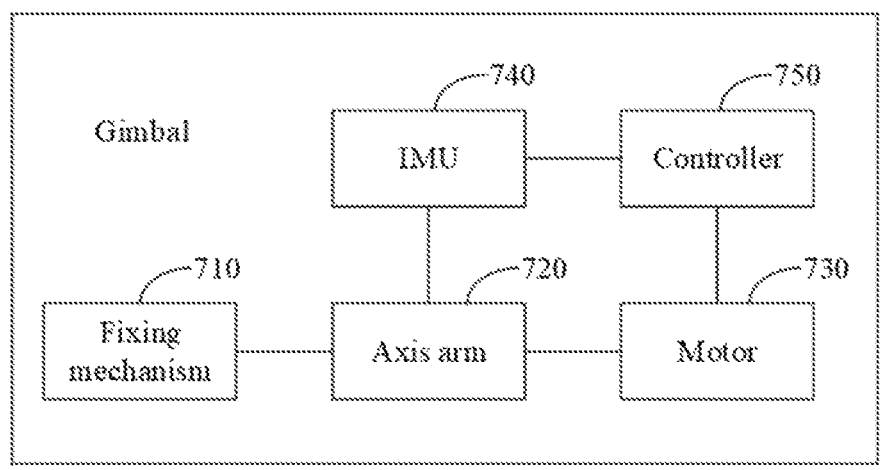
FIG. 7 is a block diagram of a gimbal according to some embodiments of the present disclosure.

FIG. 7 is a block diagram of a gimbal according to some embodiments of the present disclosure.

The gimbal includes a fixing mechanism 710, an axial arm 720, a motor 730, an IMU 740, and a controller 750.

The fixing mechanism 710 is configured to fix a photographing apparatus mounted on the gimbal.

The motor 730 is configured to drive the corresponding axial arm 720 to rotate, thereby driving the photographing apparatus to move in one or more directions.

The controller 750 is configured to obtain a working parameter of the gimbal, and if the working parameter is detected to match a preset condition that a human force is applied to the gimbal, control the motor according to the direction of gimbal applied with the human force, control the motor to drive the axial arm to rotate to a target attitude at which the human force stops to be applied to the gimbal.

In an exemplary implementation, the controller 750 may be configured to obtain a current of the motor, and measure a torque corresponding to the current according to a proportional relationship between currents and torques, detect whether the measured torque is greater than a preset torque threshold, and if the measured torque is greater than the torque threshold, determine that the torque is detected to match the preset condition that the human force is applied to the gimbal.

In some embodiments, the controller 750 may be configured to detect whether the measured torques are greater than the torque threshold within a preset time period.

In another exemplary implementation, the controller 750 may be configured to collect a measured attitude of the gimbal through the IMU 740, obtain a control deviation of the gimbal according to the measured attitude of the gimbal, detect whether the control deviation is greater than a preset deviation threshold, and if the control deviation is greater than the deviation threshold, determine that the control deviation is detected to match the preset condition that the human force is applied to the gimbal.

In some embodiments, the controller 750 may be configured to detect whether the control deviation is greater than the deviation threshold within a preset time period.

In another exemplary implementation, the controller 750 may be configured to: when the working parameter is a current of the motor, detect whether the current is greater than a preset current threshold, and if the current is greater than the current threshold, determine that the current is detected to match the preset condition that the human force is applied to the gimbal.

In some embodiments, the controller 750 may be configured to detect whether the current is greater than the current threshold within a preset time period.

In another exemplary implementation, the controller 750 may be configured to measure, through the IMU 740, the application direction when the human force is applied to the gimbal, retrieve a target speed for changing the target attitude of the gimbal, and in the application direction, according to the target speed, control the motor to drive the axial arm to rotate to the target attitude at which the human force stops to be applied to the gimbal, and the target speed is greater than the speed of the human force applied to the gimbal.

It can be seen from the above embodiment that when the working parameters of the gimbal are detected to match the preset condition of a human powered operation on the gimbal, the gimbal is controlled to change its target attitude according the direction of the human force applied to the gimbal, which compared to the existing methods of controlling the target attitude of the gimbal through a remoter controller, has a simple and intuitive operation process and a high positioning accuracy.

The system, device, module or unit illustrated in the above embodiments may be implemented by a computer chip or an entity, or by a product having a certain function. For the convenience of description, the above devices are described separately by function into various units. The functions of each unit may be implemented in one or more software and/or hardware when implementing the present application. Those skilled in the art will appreciate that embodiments of the present disclosure can be provided as a method, system, or computer program product. Accordingly, the present disclosure may take the form of an entirely hardware embodiment, an entirely software embodiment, or a combination of software and hardware. Moreover, the disclosure can take the form of a computer program product embodied on one or more computer-executable storage media (including but not limited to disk storage, CD-ROM, optical storage, etc.) including computer readable program code. The computer readable program code can be executed by a process consistent with the disclosure to perform a method consistent with the disclosure, such as one of the example methods described above.

The various embodiments in the specification are described in a progressive manner, and the same or similar parts between the various embodiments may be referred to each other, and each embodiment focuses on the differences from the other embodiments. In particular, for the system embodiment, since it is basically similar to the method embodiment, the description is relatively simple, and the relevant parts can be referred to the description of the method embodiment.

It should be noted that, in this context, relational terms, such as first, second, etc., are used merely to distinguish one entity or operation from another entity or operation, and do not necessarily require or imply there is any such actual relationship or order between these entities or operations. The terms "comprising," "including," or other variation are intended to include a non-exclusive inclusion, such that a process, method, article, or device that includes a plurality of elements includes not only those elements, but also other elements not specifically listed, or elements that are inherent to such a process, method, article, or device. An element that is defined by the phrase "comprising a . . . " does not exclude the presence of additional equivalent elements in the process, method, article, or device that includes the element.

The above description is only an embodiment of the present application and is not intended to limit the application. Various changes and modifications can be made to the present application by those skilled in the art. Any modifications, equivalents, improvements, etc. made within the spirit and scope of the present application are intended to be included within the scope of the appended claims.

What is claimed is:

1. A gimbal control method comprising:
   obtaining a working parameter of a gimbal, the gimbal comprising:
   an axial arm; and
   a motor configured to drive the axial arm to rotate to drive a photographing device mounted on the gimbal to move in one or more directions;
   detecting whether the working parameter matches a preset condition that a human force for rotating the gimbal is applied to the gimbal; and
   in response to the working parameter matching the preset condition and according to a direction of the human force applied to the gimbal, controlling the motor to drive the axial arm to rotate to a target attitude at which the human force stops to be applied to the gimbal.

2. The method according to claim 1, wherein obtaining the working parameters of the gimbal comprises:
   obtaining a current of the motor; and
   measuring a torque corresponding to the current according to a proportional relationship between currents and torques, the torque being determined as the working parameter of the gimbal.

3. The method according to claim 2, wherein detecting that the working parameter matches the preset condition that the human force is applied to the gimbal comprises:
   detecting whether the measured torque is greater than a preset torque threshold, and if the measured torque is greater than the torque threshold, detecting that the torque matches the preset condition that the human force is applied to the gimbal.

4. The method according to claim 3, wherein detecting whether the measured torque is greater than the preset torque threshold comprises: detecting whether the measured torque is always greater than the preset torque threshold within a preset time period.

5. The method according to claim 1, wherein obtaining the working parameters of the gimbal comprises:
   collecting a measured attitude of the gimbal through an inertial measurement unit (IMU) disposed on the gimbal; and
   obtaining a control deviation of the gimbal according to the measured attitude of the gimbal and determining the control deviation as the working parameter of the gimbal.

6. The method according to claim 5, wherein detecting that the working parameter matches the preset condition that the human force is applied to the gimbal comprises:
   detecting whether the control deviation is greater than a preset deviation threshold, and if the control deviation is greater than the deviation threshold, detecting that the control deviation matches the preset condition that the human force is applied to the gimbal.

7. The method according to claim 6, wherein detecting whether the control deviation is greater than the preset deviation threshold comprises:
   detecting whether the control deviation is always greater than the deviation threshold within a preset time period.

8. The method according to claim 1, wherein:
   the working parameter is a current of the motor; and
   detecting that the working parameter matches the preset condition that the human force is applied to the gimbal comprises:
   detecting whether the current is greater than a preset current threshold; and
   in response to the current being greater than the preset current threshold, detecting that the working parameter matches the preset condition that the human force is applied to the gimbal.

9. The method according to claim 8, wherein detecting whether the current is greater than the preset current threshold comprises detecting whether the current is always greater than the current threshold within a preset time period.

10. The method according to claim 1, wherein according to the direction of the human force applied to the gimbal, controlling the motor to drive the axial arm to rotate to the target attitude at which the human force stops to be applied to the gimbal comprises:
    measuring, through an inertial measurement unit (IMU) disposed at the gimbal, an application direction of the human force applied to the gimbal;
    retrieving a target speed for changing the target attitude of the gimbal, the target speed being greater than the application speed of the human force applied to the gimbal; and
    controlling, according to the target speed, the motor to drive the axial arm to rotate in the application direction to the target attitude at which the human force stops to be applied to the gimbal.

11. A gimbal, comprising:
    a fixing mechanism configured to fix a photographing apparatus mounted at the gimbal;
    one or more axial arms;
    a motor configured to drive a corresponding one of the one or more axial arms to rotate, thereby driving the photographing apparatus mounted to move in one or more directions;
    an inertial measurement unit (IMU); and
    a controller configured to:
    obtain working parameters of the gimbal;
    detecting whether the working parameter matches a preset condition that a human force for rotating the gimbal is applied to the gimbal; and
    control, in response to the working parameter matching the preset condition and according to a direction of the human force applied to the gimbal, the motor to drive the axial arm to rotate to a target attitude at which the human force stops to be applied to the gimbal.

12. The gimbal according to claim 11, wherein the controller is further configured to:
    obtain a current of the motor;
    measure a torque corresponding to the current according to a proportional relationship between currents and torques;
    detect whether the measured torque is greater than a preset torque threshold; and
    detect, in response to the measured torque being greater than the preset torque threshold, that the torque matches the preset condition that the human force is applied to the gimbal.

13. The gimbal according to claim 12, wherein the controller is further configured to detect whether the measured torque is always greater than the preset torque threshold within a preset time period.

14. The gimbal according to claim 11, wherein the controller is further configured to:
collect a measured attitude of the gimbal through the IMU;
obtain a control deviation as the working parameters of the gimbal according to the measured attitude of the gimbal;
detect whether the control deviation is greater than a preset deviation threshold; and
detect, in response to the control deviation being greater than the preset deviation threshold, that the control deviation matches the preset condition that the human force is applied to the gimbal.

15. The gimbal according to claim 14, wherein the controller is further configured to detect whether the control deviation is always greater than the preset deviation threshold within a preset time period.

16. The gimbal according to claim 11, wherein:
the working parameter is a current of the motor; and
the controller is further configured to:
detect whether the current is greater than a preset current threshold; and
detect, in response to the current being greater than the current threshold, that the working parameter matches the preset condition that the human force is applied to the gimbal.

17. The gimbal according to claim 16, wherein the controller is further configured to detect whether the current is always greater than the current threshold within a preset time period.

18. The gimbal according to claim 11, wherein the controller is further configured to:
measure an application direction when the human force is applied to the gimbal through the IMU;
retrieve a target speed for changing the target attitude of the gimbal; and
control, according to the target speed, the motor to drive the axial arm in the application direction to rotate to the target attitude at which the human force stops to be applied to the gimbal.

* * * * *